US008400346B2

(12) United States Patent  (10) Patent No.: US 8,400,346 B2
Hubbard et al.  (45) Date of Patent: Mar. 19, 2013

(54) METHOD AND APPARATUS FOR LOCATING A GOLF BALL WITH DOPPLER RADAR

(75) Inventors: Kevin M. Hubbard, Edwardsville, IL (US); Dennis P. Bevirt, O'Fallon, IL (US)

(73) Assignee: Glass Wind, LLC, O'Fallon, IL (US)

( * ) Notice: Subject to any disclaimer, the term of this patent is extended or adjusted under 35 U.S.C. 154(b) by 301 days.

(21) Appl. No.: 12/823,404

(22) Filed: Jun. 25, 2010

(65) Prior Publication Data

US 2011/0316733 A1 Dec. 29, 2011

(51) Int. Cl.
 *G01S 13/00* (2006.01)
(52) U.S. Cl. ............ 342/27; 342/175; 342/195; 342/196
(58) Field of Classification Search .................... 342/27, 342/175, 195, 196; 473/151–155, 190–199, 473/353
See application file for complete search history.

(56) References Cited

U.S. PATENT DOCUMENTS

| | | | |
|---|---|---|---|
| 3,665,463 A | 5/1972 | Kubanoff | |
| 4,673,183 A * | 6/1987 | Trahan | 473/152 |
| 5,423,549 A * | 6/1995 | Englmeier | 473/353 |
| 5,565,871 A | 10/1996 | Aker et al. | 342/176 |
| 5,662,533 A * | 9/1997 | Chadwell | 473/353 |
| 5,662,534 A * | 9/1997 | Kroll et al. | 473/353 |
| 5,700,204 A * | 12/1997 | Teder | 473/199 |
| 6,244,971 B1 | 6/2001 | Mihran | |
| 6,292,130 B1 * | 9/2001 | Cavallaro et al. | 342/104 |
| 6,456,232 B1 * | 9/2002 | Milnes et al. | 342/107 |
| 6,620,057 B1 * | 9/2003 | Pirritano et al. | 473/353 |
| 6,765,523 B2 | 7/2004 | Ono | |
| 6,832,156 B2 | 12/2004 | Farmer | |
| 6,864,831 B2 * | 3/2005 | Woodington et al. | 342/70 |
| 7,207,902 B1 * | 4/2007 | Hamlin | 473/353 |
| 7,301,453 B2 | 11/2007 | Fry | |
| 7,321,330 B2 * | 1/2008 | Sajima et al. | 342/59 |
| 7,345,618 B1 | 3/2008 | Cole et al. | |
| 7,460,014 B2 | 12/2008 | Pettus | |
| 7,498,940 B2 | 3/2009 | Pettus | |
| 7,649,467 B2 * | 1/2010 | Schimmer et al. | 340/573.4 |
| 7,766,766 B2 * | 8/2010 | Savarese et al. | 473/351 |
| 7,817,082 B2 * | 10/2010 | Dwelly et al. | 342/90 |
| 7,920,088 B2 * | 4/2011 | Thompson et al. | 342/90 |
| 8,002,645 B2 * | 8/2011 | Savarese et al. | 473/353 |
| 2002/0107078 A1 * | 8/2002 | Collins | 473/152 |
| 2004/0058749 A1 * | 3/2004 | Pirritano et al. | 473/353 |
| 2005/0070376 A1 * | 3/2005 | Savarese et al. | 473/353 |
| 2005/0179582 A1 * | 8/2005 | Woodington et al. | 342/70 |
| 2006/0128503 A1 * | 6/2006 | Savarese et al. | 473/353 |
| 2007/0013578 A1 * | 1/2007 | Iritani et al. | 342/118 |

(Continued)

*Primary Examiner* — Jack W Keith
*Assistant Examiner* — Peter Bythrow
(74) *Attorney, Agent, or Firm* — Thompson Coburn LLP

(57) ABSTRACT

A method comprises transmitting a radar signal into an target area, receiving reflected portions of the radar signal from the target area, and processing the reflected portions of the radar signal. The step of processing comprises windowing analog signals representative of the reflected portions of the radar signal, performing a fast Fourier transform on the windowed analog signals to produce an FFT result for each window, and obtaining the average of the FFT results from consecutive windows. In accordance with the method, a user receives indication from an indicator that a golf ball is present in the target area when the average of the FFT results corresponds to characteristics of the golf ball. The system comprises a radar transceiver, a processor for processing reflected portions of the radar signal, and an indicator indicating to the user a golf ball present in the target area.

20 Claims, 5 Drawing Sheets

U.S. PATENT DOCUMENTS

| | | | |
|---|---|---|---|
| 2007/0103360 A1* | 5/2007 | Nakanishi | 342/70 |
| 2007/0155520 A1* | 7/2007 | Savarese et al. | 473/131 |
| 2007/0205937 A1* | 9/2007 | Thompson et al. | 342/22 |
| 2007/0293331 A1* | 12/2007 | Tuxen | 473/199 |
| 2007/0298898 A1* | 12/2007 | Kiraly | 473/131 |
| 2008/0000364 A1* | 1/2008 | Bevirt | 101/35 |
| 2008/0207357 A1* | 8/2008 | Savarese et al. | 473/407 |
| 2009/0253526 A1* | 10/2009 | Koudele et al. | 473/155 |
| 2009/0262005 A1 | 10/2009 | McNeill et al. | |
| 2009/0262006 A1 | 10/2009 | McNeill et al. | |
| 2011/0207553 A1* | 8/2011 | Reid et al. | 473/353 |

* cited by examiner

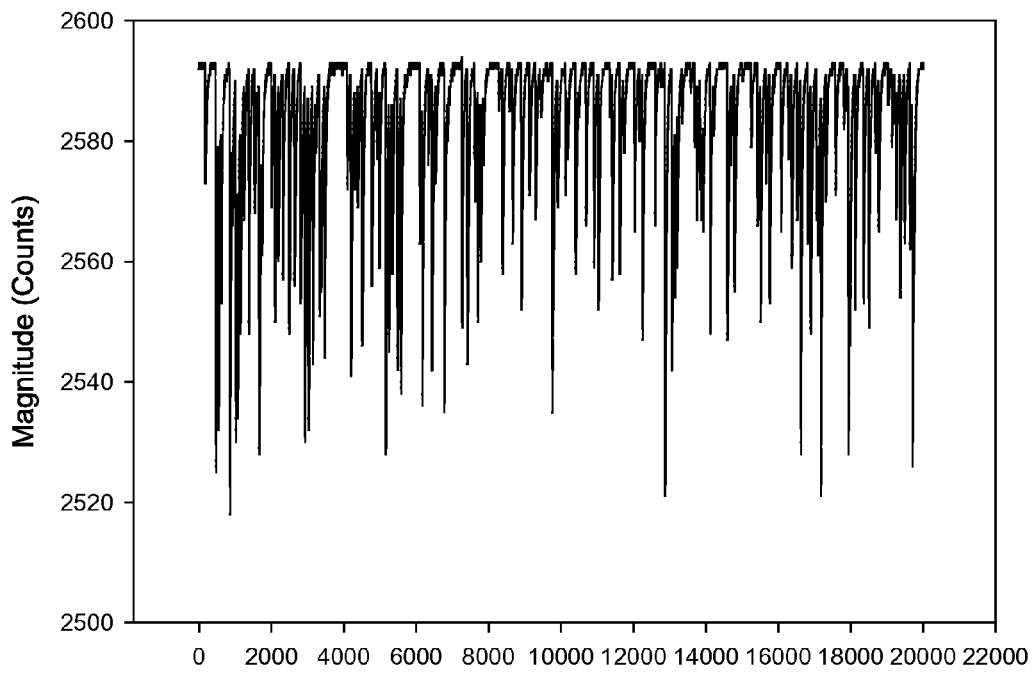
Figure 3: Raw Data, No Target Present, With Filter, Vertical Sweep
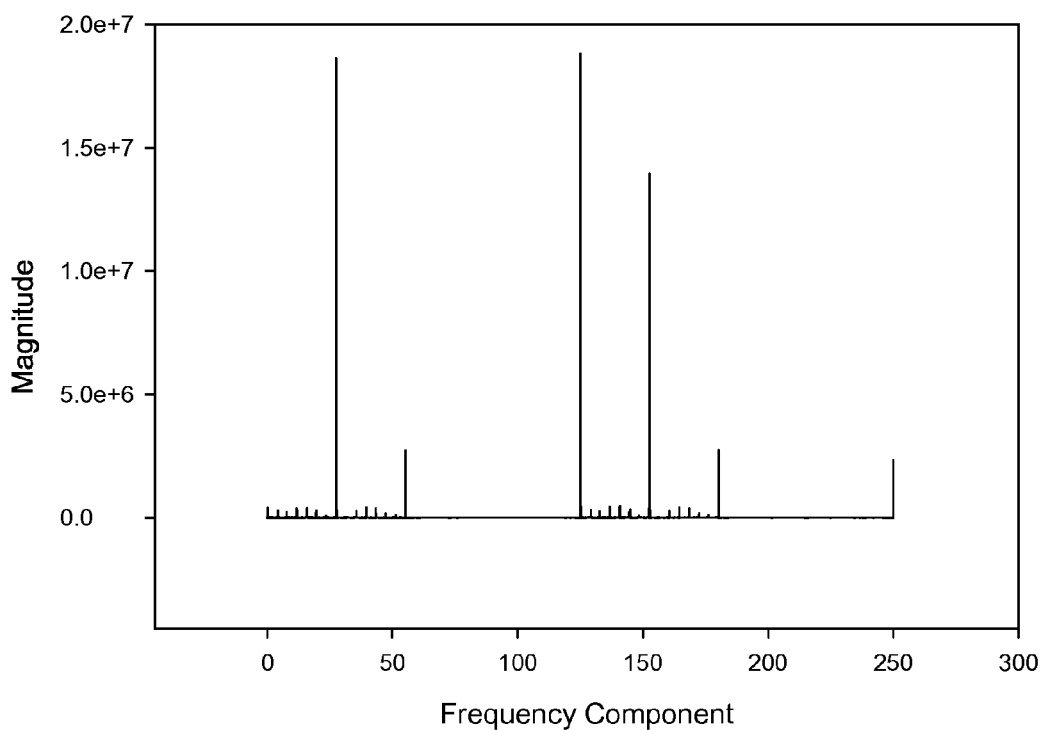
Figure 4: FFT Results, No Target Present, With Filter, Vertical Sweep

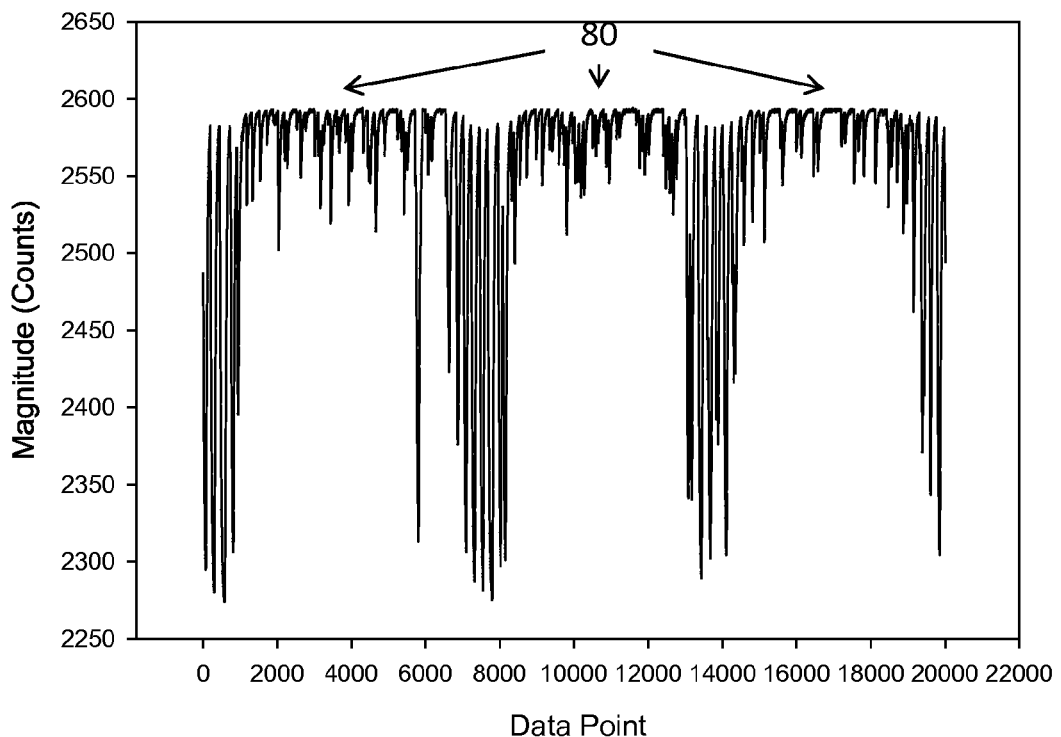
Figure 5: Raw Data, Target Present, With Filter, Vertical Sweep
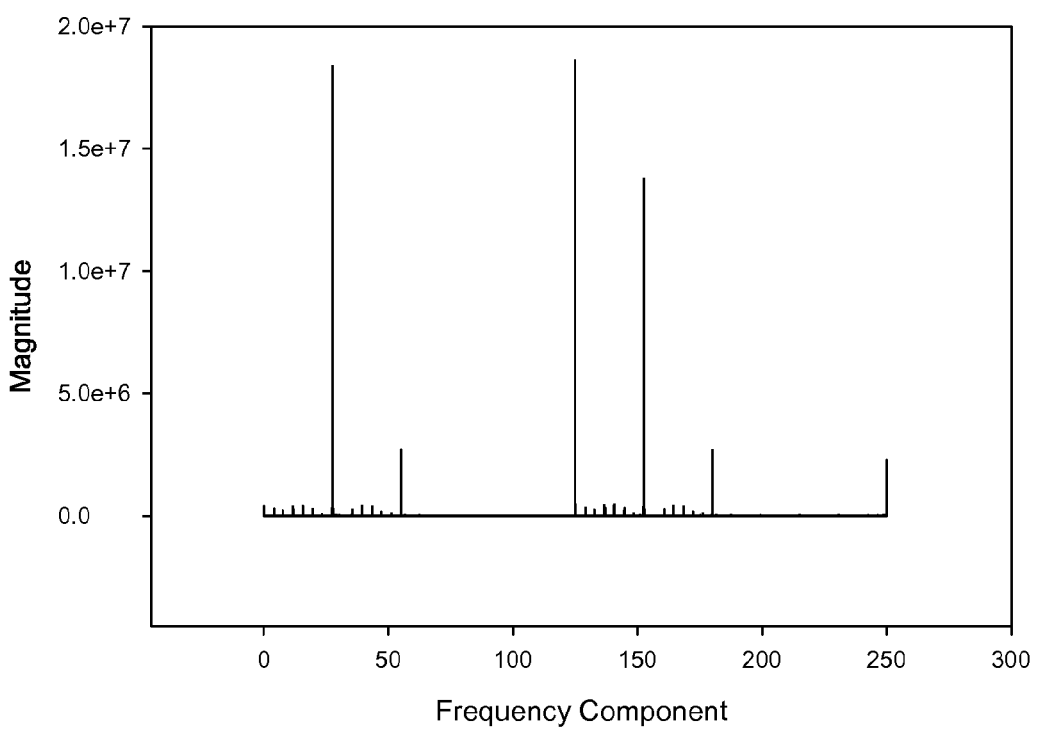
Figure 6: FFT Results, Target Present, With Filter, Vertical Sweep

METHOD AND APPARATUS FOR LOCATING A GOLF BALL WITH DOPPLER RADAR

BACKGROUND

The description herein relates to method and apparatus for locating a stationary golf ball with Doppler radar based upon inherent characteristics found in ordinary, commercially-available golf balls.

DESCRIPTION OF DRAWINGS

FIG. 3 is graph of raw data corresponding to a reflected radar signal received by the exemplary golf ball locating device with no golf ball present in a target area;

FIG. 4 is a graph of a fast Fourier transform result of the raw data of FIG. 3;

FIG. 5 is graph of raw data corresponding to a reflected radar signal received by the exemplary golf ball locating device with a golf ball present in a target area;

FIG. 6 is a graph of a fast Fourier transform result of the raw data of FIG. 5.

DETAILED DESCRIPTION OF EMBODIMENTS

Figure 1:
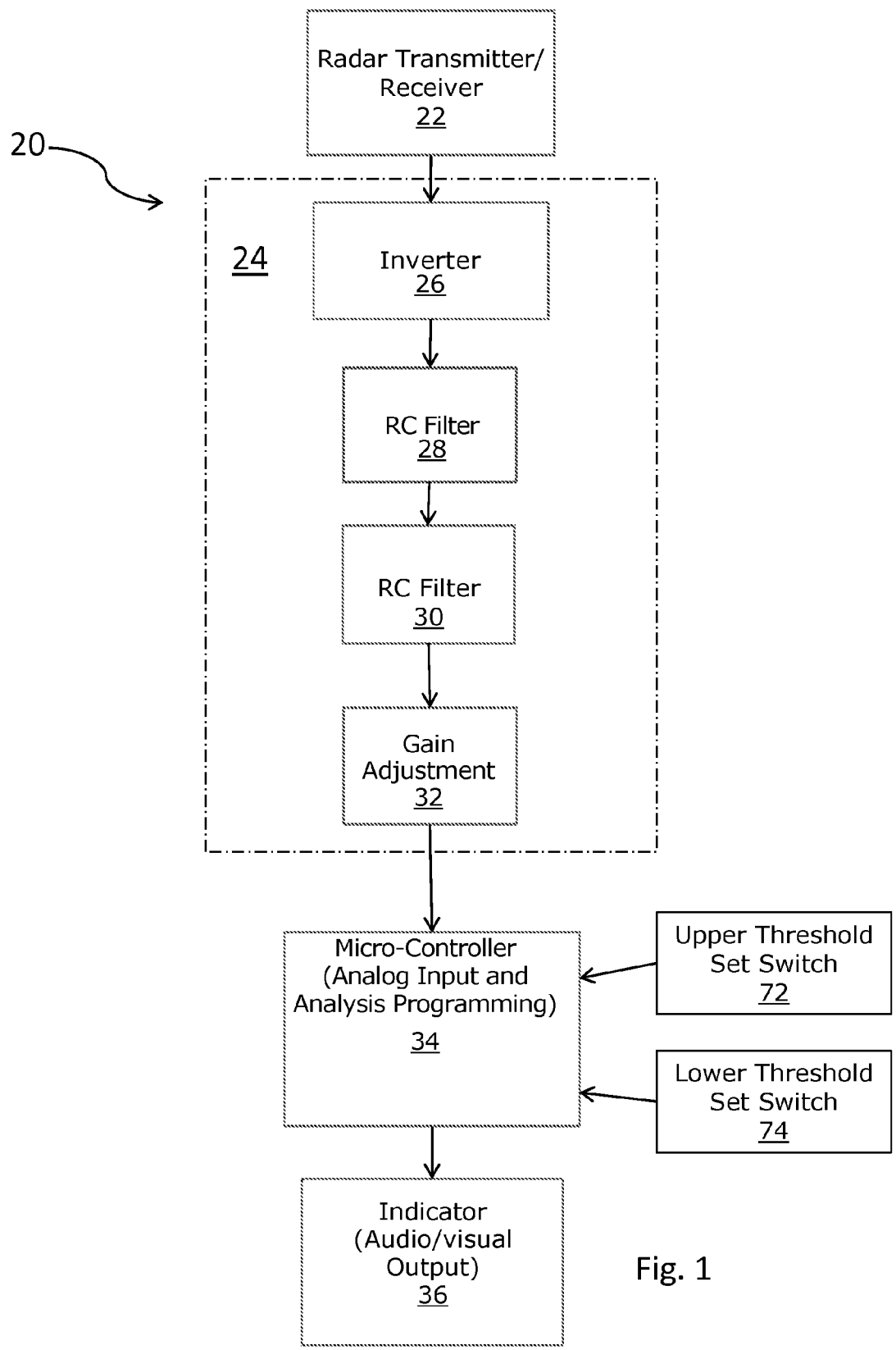
FIG. 1 is a block diagram showing hardware components of an exemplary golf ball locating device including a Doppler radar.

As shown in the schematic hardware diagram of FIG. 1, a golf ball locating device 20 comprises a Doppler radar transceiver 22 with a microwave oscillator antenna/shield adapted to transmit a radar signal to a target area and receive a portion of the reflected radar signal. The locating device 20 also includes signal conditioning components 24, such as an inverter 26, first and/or second resistive/capacitive (RC) filter(s) 28,30, and a gain adjustment 32. The signal conditioning components 24 condition the reflected portions of the transmitted radar signal into an analog signal adapted for further processing by a microcontroller 34.

The microcontroller 34 comprises digital and analog inputs and outputs, and is adapted to execute an analysis algorithm that distinguishes a portion of the reflected radar signal returned by a golf ball from signals returned by other objects. The microcontroller 34 may be programmed with instructions to acquire analog signals from the signal conditioning components and perform a fast Fourier transform (FFT) on the data in near real time as the analog signals are acquired from the signal conditioning components.

The microcontroller 34 performs an FFT that maps the analog signal time domain data into a frequency domain. The analog signal sampled over time comprises time domain data. Through the FFT, the analog time domain data is mapped into the frequency domain thereby isolating frequency components from each other, and enabling the identification of the magnitude of each frequency component. The analog signals from the signal conditioning components may be modeled using the equation $$X(f) = \int_{-\infty}^{\infty} x(t) e^{-i2\pi ft} dt$$

where $x(t)$=time domain continuous signal; $f$=frequency; $e$=inverse natural logarithm of 1; $i$=square root of negative 1; $t$=time; and $X(f)$=the continuous Fourier transform of the time domain function $x(t)$. The microcontroller collects discrete data and performs an FFT using the principles of the Cooley and Tukey fast Fourier transform. Thus, the microcontroller performs the following equations in processing the analog signals received from the signal conditioning components 24:

$$R_k = \sum_{i=0}^{N-1} x_i \cos(2\pi/N)$$

$$I_k = \sum_{i=0}^{N-1} x_i \sin(2\pi k/N)$$

where $x(i)$=discrete (sampled) time domain signal; $N$=number of data points in sample; $R_k$=real component number k of the result of the Fourier transform; and $I_k$=imaginary component number k of the result of the Fourier transform.

Using the above described algorithms, and further processing as described below in greater detail and shown in FIG. 2, the microcontroller 34 may then be configured to generate a target acquisition signal that enables an indicator 36 on the locating device, for instance, an audio and/or visual indicator, to indicate to the user the presence of a golf ball in a target area, as applicable.

In operation, the golf ball locator device 20 may waved or swept in a direction, preferably in a generally vertical path along a bearing, where the golf ball is thought to be generally located. During the waving, the Doppler radar is activated. The microwaves are transmitted by means of an antenna housed within a microwave oscillator shield of the locator device. The microwaves reflect from objects in their path, and the reflected microwaves are received by the antenna. The transceiver calculates the speed of the antenna relative to the object using the difference in frequency between the transmitted and received microwaves. Because the target comprises a stationary golf ball, the relative speed is created from the motion of the antenna as the user sweeps or waves the locator device in the direction of the search field or target area.

Figure 2:
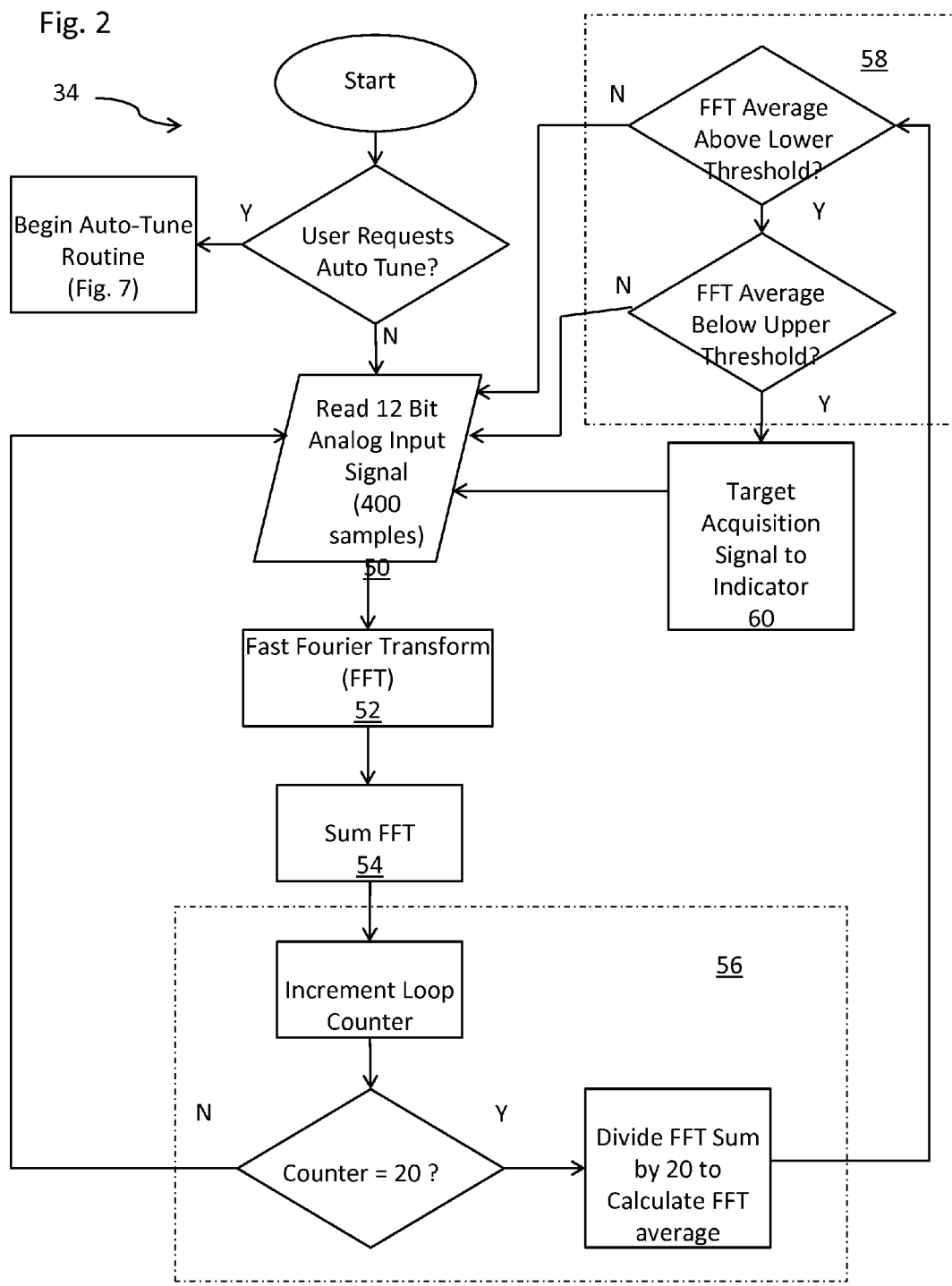
FIG. 2 is a flow chart displaying the steps involved in processing reflected radar signals in the exemplary golf ball locating device.

FIG. 2 provides a more detailed description on the steps involved in target acquisition and signal processing. The transceiver generates an analog output voltage corresponding to the relative difference in frequencies. This analog voltage signal may be received by the microcontroller 34 through an analog input point 50. The microcontroller may be programmed to take a selected number of samples of the analog voltage signals at a selected sampling rate, thus, enabling windowing of the analog voltage signals. Each sample or window of data may comprise a data set. The microcontroller performs an FFT process 52 on the data set with the result of the FFT representing a power spectrum of the raw data. The FFT maps data collected in the time domain to the frequency domain.

For instance, the microcontroller may be programmed to take four hundred samples of speed correlated data at a sampling rate of approximately 500 Hz, and the microprocessor may receive the information in via a 10 bit or 12 bit analog input. A microcontroller commercially available as a Micromint Eagle 50 from Micromint USA, LLC of Lake Mary, Fla., proved effective in processing data using the methods described herein.

FIGS. 3-6 provide visual representations of the data received and processed by the microcontroller 34. Data in the time domain may be plotted as a series of coordinate pairs ($d_t$), each pair representing one data point or measurement. Once the data has been transformed into the time domain via the FFT, it may be plotted as a series of data points ($m_f$). The variable (m) represents the magnitude of each frequency component in the signal and the variable (f) represents the frequency at which that magnitude appears. In each of the graphs shown in FIGS. 3-6, the radar transceiver operated at 2.6 GHz and a wavelength of $1.097 \times 10^{-4}$ meters. The microcontroller obtained 400 samples at a sampling rate of approximately 500 Hz. 50 data sets were obtained. A radar with characteristics similar to a commercially available radar kit model Ramsey SG7 from Ramsey Electronics, Inc. of Victor, N.Y., proved effective in employing the methods described herein. In each of the graphs of FIGS. 3 to 6, the vertical axes is expressed in "counts." For purposes of illustration and not in any limiting sense, the data is expressed in this format based upon the hardware incorporated in the locator device. As mentioned previously, a microprocessor such as a Micromint Eagle 50 may be used. This device incorporates a 10 bit analog input. For a 10 bit analog input incorporated into a microcontroller, one count is equal to one subdivision of $2^{10}$ subdivisions of the entire signal range, or approximately 0.000977 of the signal range.

FIG. 3 shows raw data comprising approximately 20000 measurements of received analog radar signals reflected from a target area where no golf ball is present. As shown in FIG. 3, the signals are fairly random with wide variation (~2520 to ~2590). FIG. 4 shows the FFT result of the same 20000 data points. FIG. 5 shows raw data comprising approximately 20000 measurement analog radar signals reflected from a target area with a golf ball present. As shown in FIG. 5, a majority of the data points have little variation (~2590-2550) corresponding to areas 80 (i.e., lands) between adjacent dimples of the golf ball. Areas of relatively larger variation (~2275 to ~2590) correspond to the dimple or concave surfaces of the golf ball. FIG. 6 shows the FFT result of the same 20000 data points.

Referring to FIG. 2, the microcontroller is preferably configured to average the FFT result from each consecutive data set or window in order to characterize each data set by a single number. The averaging process 56 eliminates noise and enables the determination of the presence of a target (i.e., gold ball) in the target area. For instance, FIG. 2 shows the FFT calculation process 52 for each window, the FFT summing process 54 for twenty consecutive windows, and the averaging process 56 of the twenty FFT results to determine the presence of a golf ball in the target area.

Figure 7:
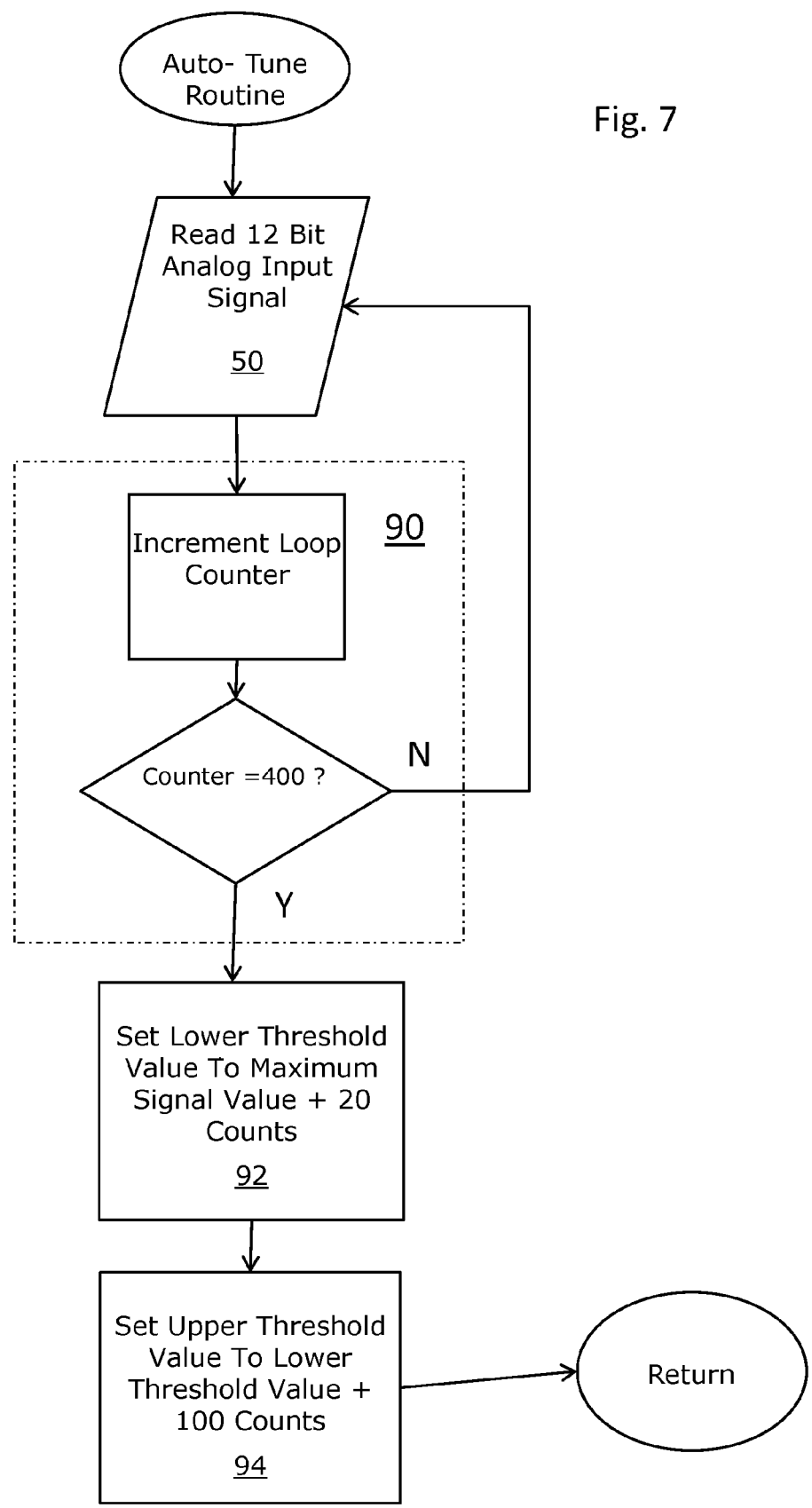
FIG. 7 is a flow chart displaying the steps involved in setting lower and upper thresholds for locating a golf ball for the exemplary golf ball locating device.

The microcontroller is preferably configured to compare the average of the FFT results against a lower and an upper threshold. The comparison process 58 establishes whether a golf ball is present in the target area. The lower and upper limits may be defined by the user or may be automatically set, for instance, through auto-tuning sequence as shown in FIG. 7. If the average of the FFT results falls inside the window defined by the user, for instance, above the lower threshold limit and/or below the upper threshold limit, then the microcontroller is enabled to generate a target acquisition signal 60 that is received by the indicator 36 indicating to the user a positive target presence (i.e., golf ball) in the target area. An average FFT result below the lower threshold indicate no significant returned signal, and the microprocessor is configured to begin again the process of sampling analog radar signals. An average FFT result above the upper threshold indicate the presence of an object (coin, nail, etc.) other than a golf ball, and the microprocessor is configured to begin again the process of sampling analog radar signals.

The thresholds (lower and upper) may be set manually by via switches 72,74 (FIG. 1) mounted on the locating device, for instance, a pistol grip of the device. The switches may be activated prior to the user beginning a sweep of the target area. The user may sweep a non-target area to establish the thresholds prior to sweeping the target area. Preferably, the non-target area has environmental characteristics similar to the target area.

Alternatively, the thresholds may be set using an auto-tuning routine incorporated in the microcontroller software. FIG. 7 shows a flowchart of the steps involved in the auto-tuning routine. The auto-tuning routine comprises a data collection process similar to that described previously where the microprocessor 34 is enabled to perform a sampling process 90 in which analog signals are received from the analog input 50. Preferably, 400 samples are obtained, and thereafter, the microcontroller 34 is configured to set the lower threshold at a level slightly greater than that of the background noise 92, and the upper threshold based upon the maximum variation in the collected data 94. The upper and lower thresholds may vary depending upon environment conditions, such as soil composition, clay content, rocks, moisture levels, wind, blowing grass, etc.

As the transmitter/receiver is swept while searching for the target, the average FFT result will be different depending on whether the target is present. If the target is present, then the dimples on the golf ball create a reflected radar analog signal with an average FFT result having a magnitude slightly higher than background reflected signals. The magnitudes may be representative of frequencies corresponding to the spacing of the dimples. Although the magnitude of the analog signal may also correspond to the speed at which the locator device is swept, the same user will generally perform a sweeping motion in the same fashion as the locating device is used and as the upper and lower thresholds are set. Thus, variation from the sweeping motion may be effectively eliminated through consistent sweeping motion during initial setting of the thresholds and later operation. The average FFT result tends to be distributed relatively randomly when no target is present. When a target is present, the average FFT result tends to lie between lower and upper threshold values. With the radar operating parameters described above, the difference in average FFT results returned by a golf ball and the average FFT results returned in a non-target are corresponds to roughly 80 units of magnitude, for instance, as shown in FIG. 7, the lower threshold is set at approximately 20 units of magnitude above background noise levels, and the upper threshold is set at approximately 100 units of magnitude above the lower threshold. The target acquisition signal indicating the presence of a golf ball in the target area may also be generated without regard to one threshold. For instance, the microcontroller may be configured to generate the target acquisition signal is if the average FFT result is above the lower threshold without regard to the upper threshold. Likewise, the microcontroller may be configured to generate the target acquisition signal is if the average FFT result is below the upper threshold without regard to the lower threshold.

Although operation is subject to variations in user technique and environmental conditions, tests using a radar with the operating parameters described above in field conditions using both dry and wet soil, and with/without the presence of false targets such as coins, nails, screws, limestone, and iron pyrite, were successful in identifying true targets, and rejecting false targets, including at ranges up to 17 feet.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method comprising:
transmitting a doppler radar signal into an target area by moving a transmitter of the radar signal across the target area;
receiving reflected portions of the radar signal from the target area;
processing the reflected portions of the radar signal by windowing analog signals representative of the reflected portions of the radar signal, performing a fast Fourier transform on the windowed analog signals to produce an FFT result for each window, and obtaining the average of the FFT results from consecutive windows; and
indicating to the user a golf ball present in the target area when the average of the FFT results corresponds to characteristics of a golf ball.

2. The method of claim 1 further comprising:
establishing a lower threshold based upon a level of background noise from a sample of reflected portions of a radar signal directed to a non-target area having environmental characteristics similar to the target area.

3. The method of claim 2 further comprising:
indicating to the user the presence of the golf ball when the average of the FFT results is above the lower threshold.

4. The method of claim 1 further comprising:
establishing an upper threshold based upon a maximum variation in a sample of reflected portions of a radar signal directed to a non-target area having environmental characteristics similar to the target area.

5. The method of claim 4 further comprising:
indicating to the user the presence of the golf ball when the average of the FFT results is below the upper threshold.

6. The method of claim 1 wherein the characteristics of the golf ball comprise a spacing of the dimples on the golf ball.

7. A method comprising:
transmitting a doppler radar signal in a target area by moving a transmitter of the radar signal across the target area;
receiving reflected portions of the radar signal from the target area;
processing the reflected portions of the radar signal by windowing analog signals representative of the reflected portions of the radar signal, performing a fast Fourier transform on the windowed analog signals to generate an FFT result for each window, and obtaining the average of the FFT results from consecutive windows; and
indicating to the user a golf ball present in the target area when the average FFT result falls within a user defined window, the user defined window being based upon predetermined results representative of reflected radar signals corresponding to characteristics of a golf ball.

8. The method of claim 7 wherein the user defined window includes a lower threshold based upon a level of background noise from a sample of reflected portions of a radar signal directed to a non-target area having environmental characteristics similar to the target area.

9. The method of claim 7 wherein the user defined window includes an upper threshold based upon a maximum variation in a sample of reflected portions of a radar signal directed to a non-target area having environmental characteristics similar to the target area.

10. The method of claim 7 wherein the predetermined results are representative of reflected radar signals corresponding to a spacing of dimples on the golf ball.

11. A system comprising:
a doppler radar transceiver adapted to transmit a radar signal into a target area and receive reflected portions of the radar signal from the target area;
a processor configured to: (i) window analog signals representative of the reflected portions of the radar signal; (ii) perform a fast Fourier transform on the windowed analog signals to generate an FFT result for each window; and (iii) average the FFT results from consecutive windows; and
a indicator indicating to the user a golf ball present in the target area when the average of the FFT results falls within a user defined window, the user defined window being based upon predetermined results representative of reflected radar signals corresponding to characteristics of a golf ball when the transceiver is moved across the target area.

12. The system of claim 11 wherein the user defined window includes a lower threshold based upon a level of background noise from a sample of reflected portions of a radar signal directed to a non-target area having environmental characteristics similar to the target area.

13. The system of claim 11 wherein the user defined window includes an upper threshold based upon a maximum variation in a sample of reflected portions of a radar signal directed to a non-target area having environmental characteristics similar to the target area.

14. The system of claim 11 wherein the predetermined results are representative of reflected radar signals corresponding to a spacing of dimples on the golf ball.

15. A system comprising:
a doppler radar transceiver adapted to transmit a radar signal into a target area and receive reflected portions of the radar signal from the target area;
a processor configured to: (i) window analog signals representative of the reflected portions of the radar signal; (ii) perform a fast Fourier transform on the windowed analog signals to generate an FFT result for each window; and (iii) average the FFT results from consecutive windows; and
an indicator configured to indicate to the user a golf ball present in the target area when the average of the FFT results corresponds to characteristics of a golf ball when the transceiver is moved across the target area.

16. The system of claim 15 wherein the processor is further configured to establish a lower threshold based upon a level of background noise from a sample of reflected portions of a radar signal directed to a non-target area having environmental characteristics similar to the target area.

17. The system of claim 16 wherein the indicator indicates to the user the presence of the golf ball when the average of the FFT results is above the lower threshold.

18. The system of claim 15 wherein the processor is further configured to establish an upper threshold based upon a maximum variation in a sample of reflected portions of a radar signal directed to a non-target area having environmental characteristics similar to the target area.

19. The system of claim 18 wherein the indicator indicates to the user the presence of the target when the average of the FFT results is below the upper threshold.

20. The system of claim 15 wherein the characteristics of the golf ball comprise a spacing of dimples on the golf ball.

* * * * *